US012103483B2

(12) United States Patent
Doursoux

(10) Patent No.: US 12,103,483 B2
(45) Date of Patent: Oct. 1, 2024

(54) DEVICE FOR RETAINING A VEHICLE STEERING WHEEL SAFETY MODULE

(71) Applicant: Autoliv Development AB, Vargarda (SE)

(72) Inventor: Hugues Doursoux, Serqueux (FR)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 18/264,188

(22) PCT Filed: Feb. 7, 2022

(86) PCT No.: PCT/EP2022/052817
§ 371 (c)(1),
(2) Date: Aug. 3, 2023

(87) PCT Pub. No.: WO2022/167632
PCT Pub. Date: Aug. 11, 2022

(65) Prior Publication Data
US 2024/0092302 A1    Mar. 21, 2024

(30) Foreign Application Priority Data

Feb. 8, 2021 (FR) ...................................... 2101188

(51) Int. Cl.
*B60R 21/203* (2006.01)
(52) U.S. Cl.
CPC ........ *B60R 21/2037* (2013.01); *B60R 21/203* (2013.01); *B60R 21/2035* (2013.01)
(58) Field of Classification Search
CPC .............. B60R 21/203; B60R 21/2035; B60R 21/2037
USPC ............................................... 280/728.2, 731
See application file for complete search history.

(56) References Cited

U.S. PATENT DOCUMENTS

| | | | |
|---|---|---|---|
| 2003/0178825 A1 | 9/2003 | Schutz et al. | |
| 2004/0239080 A1* | 12/2004 | Berrahou ............... | B60R 21/203 280/728.2 |
| 2011/0169253 A1* | 7/2011 | Bosch ................... | B60R 21/203 280/741 |

(Continued)

FOREIGN PATENT DOCUMENTS

| | | | | |
|---|---|---|---|---|
| CN | 104859577 A | * | 8/2015 | |
| CN | 208630547 U | * | 3/2019 | |
| DE | 102007006571 A1 | * | 9/2007 | ......... B60R 21/2035 |

(Continued)

*Primary Examiner* — Keith J Frisby
(74) *Attorney, Agent, or Firm* — Matthew D. Thayne; Thayne and Davis LLC

(57) ABSTRACT

A device for retaining a safety module mounted on a vehicle steering wheel structure, comprising:
  at least one latching element,
  at least one elastic element that is arranged so as to engage with the latching element in order to retain the safety module on the steering wheel structure,
the elastic element comprising a contact portion arranged such that, when there is a movement of mounting the safety module on the steering wheel structure, it comes into contact with a guide track arranged on an actuation face of the latching element located facing the elastic element,
wherein the guide track is arranged on a first side of the latching element, and in that the actuation face has at least one offset arranged between the guide track and a second side of the latching element.

17 Claims, 2 Drawing Sheets

(56) References Cited

U.S. PATENT DOCUMENTS

2017/0174167 A1\* 6/2017 Collazo Gomez .. B60R 21/2037
2022/0017035 A1\* 1/2022 Kim ................... B60R 21/2037

FOREIGN PATENT DOCUMENTS

| EP | 1179457 A1 | \* | 2/2002 |
| EP | 3650289 A1 | | 5/2020 |
| JP | 2010228514 A | \* | 10/2010 |
| JP | 6471051 B2 | \* | 2/2019 |
| KR | 20000045838 A | \* | 7/2000 |
| WO | 2009/048055 A1 | | 4/2009 |

\* cited by examiner

[Fig. 1]
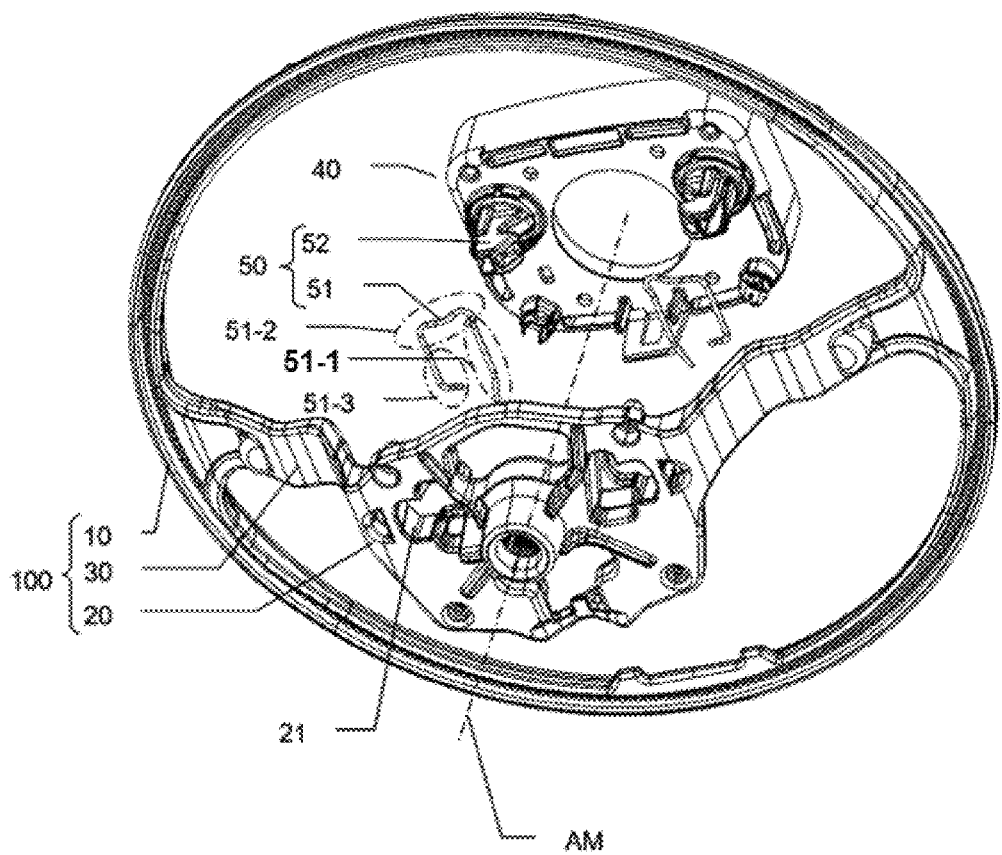
[Fig. 2]
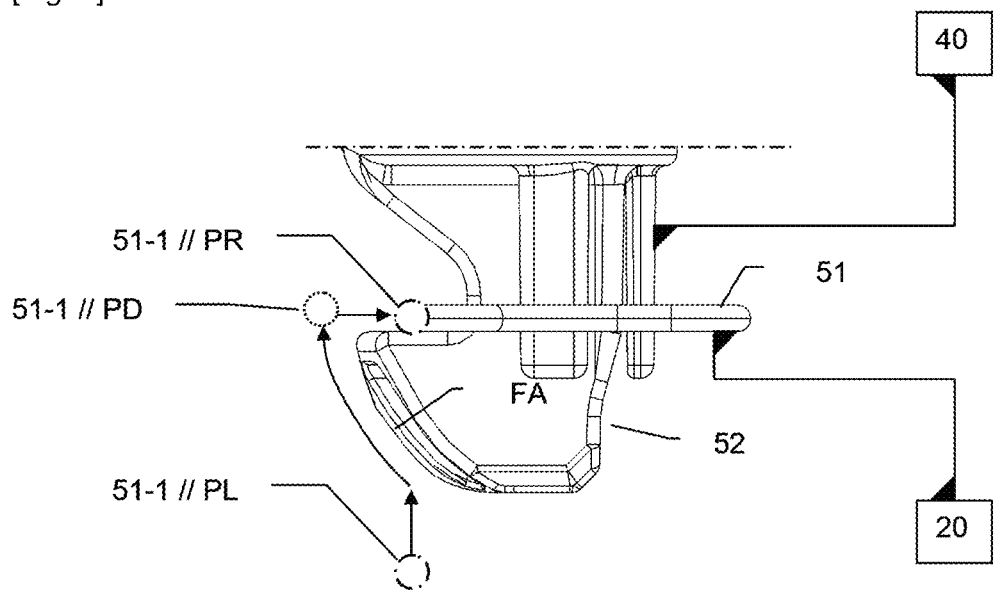

[Fig. 3]
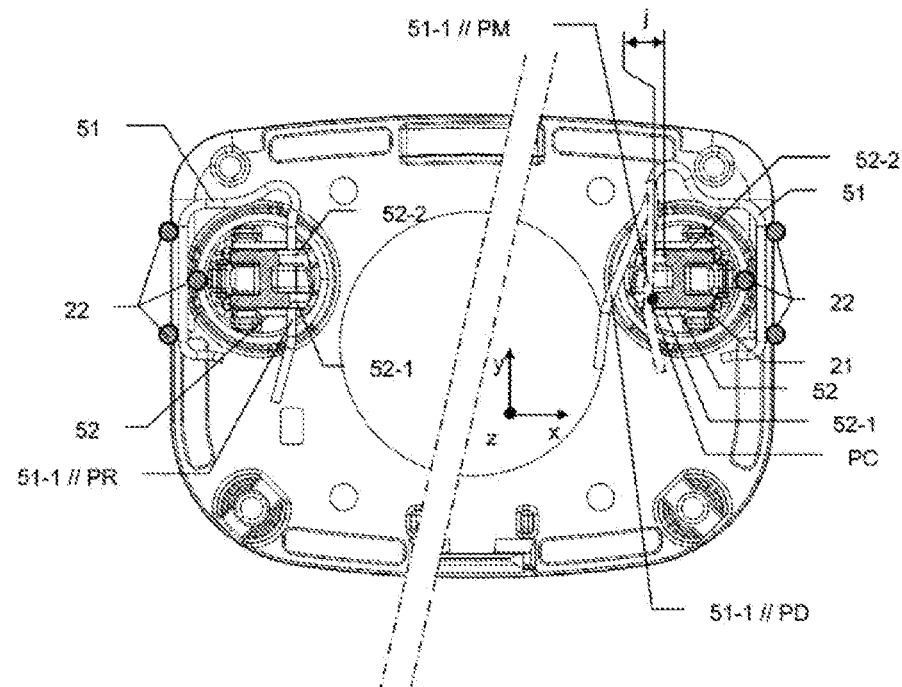
[Fig. 4]
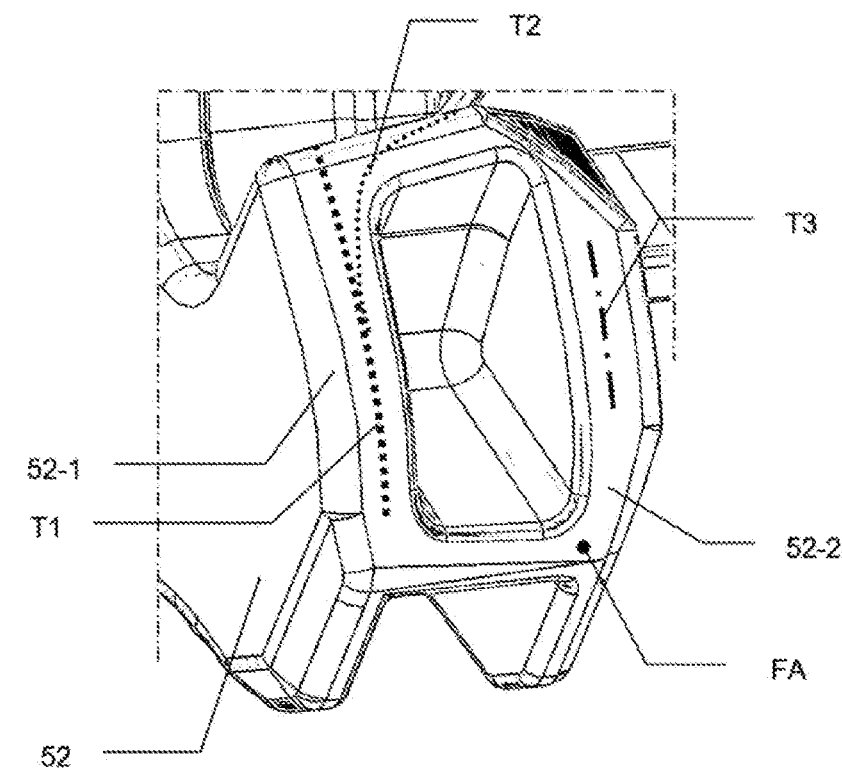

DEVICE FOR RETAINING A VEHICLE STEERING WHEEL SAFETY MODULE

TECHNICAL FIELD OF THE INVENTION

This invention generally relates to a device for retaining a safety module onto a motor vehicle steering wheel.

STATE OF THE ART

In the prior art, devices for retaining a safety module on a motor vehicle steering wheel, such as that disclosed for example in document WO2009/048055, are known, typically comprising an elastic element (an elastic rod) arranged to occupy a retaining position with latching elements (hooks for example) to retain the safety module. To mount the safety module on the steering wheel, guide tracks are provided on the latching elements to progressively deform the elastic element in order to cause it to pass a protruding point corresponding to the peak of the hook, before the elastic element can expand to occupy the retaining position. It is important to guarantee the lowest possible forces during mounting to reduce assembly constraints, and to reduce the difficulty of these assembly operations.

In addition, it is known to form latching elements made of plastic or polymer, to integrate them directly into the housing of the safety module. In view of the forces exerted on these latching elements, it may be necessary to provide large widths or cross-sections. However, because of the bulk, this can return to decreasing or poorly control leverage on the bending of the elastic element during mounting, which may lead to increasing the forces to be applied during mounting. In particular, the above-mentioned document proposes no solution to guarantee that the forces are reduced as much as possible and/or whose increase during the movement of mounting is controlled.

Document EP1179457A1 discloses in FIG. 2 hooks 6A, 6B forming a latching element and discloses in FIG. 3 a rod 19 forming an elastic element provided to engage with the hooks 6A and 6B. During the coupling between these parts, the rod 19 must slide over the inclined and ribbed slope of the hooks 6A, 6B. The point of contact between the rod 19 and each of the hooks 6A and 6B is located on the rib which forms the side or the flank of the hooks 6A, 6B which is situated toward the deformable portion or which bends from the rod 19. As a result, a significant coupling resistance force is exerted by the rod 19 on the hooks 6A, 6B.

DISCLOSURE OF THE INVENTION

One aim of the present invention is to address the disadvantages of the prior art mentioned above and in particular, first of all, to propose a retaining device comprising a latching element and an elastic element to be deformed during a movement of mounting, with mounting forces as low as possible, and/or the increase of which during the movement of mounting is controlled.

A first aspect of the invention therefore relates to a device for retaining a safety module mounted on a vehicle steering wheel, comprising:
at least one latching element, such as a hook, rigidly connected to one of the safety module or the steering wheel structure,
at least one elastic element, rigidly connected to the other of the safety module or of the steering wheel structure, and arranged so as to engage with the latching element in order to retain the safety module on the steering wheel structure,
the elastic element comprising a contact portion arranged such that, when there is a movement of mounting the safety module on the steering wheel structure, it comes into contact with a guide track arranged on an actuation face of the latching element located facing the elastic element, the guide track being arranged to deform the elastic element to a released position of the latching element, during the movement of mounting carried out in a mounting direction,
characterized in that the guide track is arranged on a first side of the latching element, and in that the actuation face has at least one offset arranged between the guide track and a second side of the latching element.

According to the above implementation, the actuation face is the face of the latching element that faces the elastic element during the movement of mounting. This is typically a surface inclined relative to the mounting direction, to retract or automatically move the elastic element so as to "pass" a protrusion that separates the actuation face from a receiving portion that receives the elastic element so that it occupies a retaining position wherein it can engage with the latching element. The actuation face comprises a guide track which is typically the part of the actuation face on which the elastic element will be in contact and sliding during the mounting movement, and the actuation face also comprises an offset, that is, a recess, a slope, a valley, which guarantees that the elastic element does not contact another portion of the actuation face. Thus, the contact between the guide track and the elastic element remains firmly on the first side of the latching element, which guarantees that the force necessary to move the elastic element (which is typically deformed in bending) remains that which is planned.

According to one embodiment, the offset may be defined to leave a strictly positive gap between the elastic element and the rest of the actuation face, and in particular with the second side of the latching element during the movement of mounting. In other words, throughout the assembly, no parasitic contact between the latching element and the elastic element and outside the guide track is involved.

According to one embodiment, in a cutting plane, preferably normal to the mounting direction, and in a direction defined by a force exerted by the elastic element on the latching element, the first side may have a first length, greater than a second length of the second side. Typically, the latching element has an asymmetrical cross section.

According to one embodiment, in at least one cutting plane, preferably normal to the mounting direction, the latching element may have an H-shaped section, with a first flange of the H arranged on the first side and a second flange of the H arranged on the second side, the first flange being able to have a first length greater than the second length of the second flange.

According to one embodiment, the elastic element may comprise a deformable portion connected to the contact portion, and the second side may be arranged between the deformable portion and the first side. This implementation guarantees that the leverage between the deformable portion and the point of contact between the latching element and the elastic element is as large as possible, which provides the lowest possible bending force to deform the elastic element.

According to the above embodiment, the elastic element may comprise a deformable portion connected to the contact portion, and the second side may be arranged between the deformable portion and the first side. In other words, the elastic element may comprise a free end connected to the contact portion, and the first side may be arranged between the free end and the second side. In other words, the elastic element may comprise a free end opposite the deformable portion, and the offset is provided to guarantee that the point of contact between the elastic element and the latching element remains firmly on the side of the free end (to maintain the lowest possible bending force of the elastic element).

According to one embodiment, the offset is arranged between the contact path and the portion of the elastic element which deforms and/or which generates the return force of the elastic element in the locked position.

According to one embodiment, during the movement of mounting, a distance between the deformable portion and the point of contact between the contact path and the contact portion may be less than 40 mm.

According to one embodiment, the elastic element may be arranged to be deformed in bending during the movement of mounting, and the bending or movement direction may be normal to the mounting direction.

According to one embodiment, in a plane comprising the mounting direction, and normal to the direction of movement of the portion of the elastic element in contact with the guide track during the movement of mounting, the first side and the second side may define two lateral edges of the latching element.

According to one embodiment, the first side and the second side may be along or adjacent to two lateral faces of the latching element substantially parallel to a plane comprising the mounting direction and the direction of movement of the portion of the elastic element in contact with the guide track during the movement of mounting.

According to one embodiment, the latching element may comprise two ribs, and the guide track may be formed on only one of the two ribs. Providing such ribs makes it possible to obtain a structure of the latching element that is lightweight and easy to manufacture, for example by molding or injection molding, while being resistant to the forces undergone during mounting or during the retention of the safety module.

According to one embodiment, the latching element may be made of plastic and/or polymer material. Such materials imply that the latching element must have large dimensions (for example at least 5 mm, preferably at least 8 mm) between the first side and the second side to be sufficiently robust. As a result, parasitic contacts at the second side for example lead to significant variations in the leverage and forces, and the gap provided on the actuation face prevents such a situation from occurring.

According to one embodiment, the latching element may be formed by an injection molding process.

According to one embodiment, the latching element may be rigidly connected to the safety module, and preferably may be formed monolithically or of the same piece as a housing of the safety module. Such an implementation makes it possible to reduce manufacturing costs.

According to one embodiment, the latching element may be attached to the housing of the safety module, for example by overmolding or crimping. This allows greater freedom in the choice of materials and methods for optimizing the manufacturing strength or cost. In particular, this implementation for the latching element makes it possible to combine the choice of a first plastic suitable for constraints specific to the housing (flexibility, UV resistance, etc.), and a second plastic suitable for constraints specific to the latching element (resistance to the forces of the elastic element, with a particular content of reinforcing fibers, with a particular friction coefficient, etc.). It should be noted that, for example, for overmolding, it may be considered that the housing-latching element mounting remains made of a single piece.

According to one embodiment, the guide track may be arranged to provide a linear or preferably spot contact with the contact portion.

According to one embodiment, the retaining device may comprise two latching elements and one or two elastic elements.

According to one embodiment, the mounting direction may be comprised in a median plane comprising a straight line parallel to a direction of movement of the contact portion and normal to the mounting direction, and the first side and the second side of the latching element are arranged on either side of the median plane.

According to one embodiment, the offset may be arranged to guarantee that, during the movement of mounting, the point of contact between the contact path and the contact portion can remain in a predetermined area of the latching element.

According to one embodiment, the offset may be arranged to guarantee that, during the movement of mounting, the point of contact between the contact path and the contact portion can have a rectilinear trajectory.

According to one embodiment, the offset may be arranged to guarantee that, during the movement of mounting, the point of contact between the contact path and the contact portion does not approach the second side.

According to one embodiment, the offset may be arranged to guarantee that, during the movement of mounting, the point of contact between the contact path and the contact portion can remain at a constant distance or can move away from a deformation zone of the elastic element.

According to one embodiment, the offset may be arranged to guarantee that, during the movement of mounting, the point of contact between the contact path and the contact portion can define a leverage on the elastic element which is constant or which increases during the movement of mounting.

According to one embodiment, the offset may be arranged to guarantee that, during the movement of mounting, the point of contact between the contact path and the contact portion can define a bending length on the elastic element which is constant or which increases during the movement of mounting.

According to one embodiment, the guide track may be arranged only on the first side of the latching element.

According to one embodiment, the guide track may be arranged only on a first half of the latching element.

According to one embodiment, the guide track may have, in the mounting direction, a width less than a thickness or a diameter of the elastic element, and preferably less than half the thickness or diameter of the elastic element.

According to one embodiment, the guide track may have, in the mounting direction, a width of less than 5 mm, preferably less than 4 mm.

According to one embodiment, the offset may be defined to leave a strictly positive gap between the elastic element and the entire rest of the actuation face.

According to one embodiment, the latching element may be a hook.

According to one embodiment, the actuation face of the latching element may be a face inclined relative to the mounting direction and opening onto a rim or a heel.

A second aspect of the invention relates to a vehicle steering wheel comprising a retaining device according to the first aspect of the invention.

A third aspect of the invention relates to a motor vehicle comprising a vehicle steering wheel according to the second aspect of the invention.

DESCRIPTION OF THE FIGURES

Other features and advantages of the present invention will become more apparent upon reading the following detailed description of an embodiment of the invention, which is provided by way of example but in no manner limited thereto, and illustrated by the attached drawings, in which:

FIG. 1 shows an exploded view of a steering wheel comprising a steering wheel structure, a safety module and a device for retaining the safety module on the steering wheel structure according to the invention, FIG. 2 shows a side view of a latching element and an elastic element of the retaining device of FIG. 1;

FIG. 3 shows a top view in cross-section of the retaining device of FIG. 1, with, in the left-hand part, the elastic element of the retaining device of FIG. 1 in a retaining position, and in the right-hand part, the elastic element of the retaining device of FIG. 1 in a released position or being mounted of the safety module of FIG. 1;

FIG. 4 depicts a perspective view of the latching element of the retaining device of FIG. 1.

DETAILED DESCRIPTION OF EMBODIMENT(S)

FIG. 1 shows a vehicle steering wheel that generally comprises a rim 10, connected to a hub 20 by branches 30. A safety module 40 is provided to be mounted on the hub 20 and typically comprises an airbag. Conventionally, the vehicle steering wheel is mounted on a steering column or gear to be pivotable about a hub axis AM.

The safety module 40 must be held on the hub 20 while being able for example to be movable relative to the hub 20 in order to actuate an audible warning (for example in the direction of the axis AM, or another direction), and the vehicle steering wheel comprises for this purpose a retaining device 50 formed in particular by:

two hooks 52 rigidly connected to the safety module 40 and arranged to pass at least partially through passage holes 21 provided in the hub 20, two elastic rods 51 rigidly connected to the hub 20 and arranged opposite each passage hole 21 to engage with one of the hooks 52.

As shown in FIG. 1, each elastic rod 51 comprises a contact portion 51-1, arranged to come into contact with the hook 52 of the safety module 40, a deformation portion 51-2, which allows the elastic rod to deform in particular during mounting, and also to maintain and return the contact portion 51-1 into the retaining position, and an anchoring portion 51-3, which will be engaged or fixed with the hub 20.

As regards the hooks 52, they are formed directly on the housing of the safety module 40, and may be formed from a plastic material (for example polyamide, preferably with a filler material such as glass fibers). It may be provided, as shown in FIG. 1, to form the hooks 52 with ribs, to facilitate molding operations (better cooling, less deformation or shrinkage, etc.).

In other words, the hub 20 forms a structure of the steering wheel 100, on which the safety module 40 may be held by an elastic element (the elastic rod(s) 51) arranged so as to engage with a latching element (the hook(s) 52).

As shown in FIG. 2, once the safety module 40 is mounted on the hub 20: each elastic rod 51 (rigidly connected to the hub 20) can prevent any movement of the hook 52 (rigidly connected to the safety module 40) towards the top of FIG. 2. In FIG. 2, the part of the elastic rod 51 engaged with the hook 52 occupies a retaining position PR, occupied naturally.

It can also be noted that FIG. 2 shows the hook 52 seen from the side that the latter has an actuation face FA inclined relative to the vertical of FIG. 2 to allow mounting of the safety module 40 on the hub 20.

Indeed, before the mounting of the safety module 40, therefore before taking up the retaining position PR engaged with the hook 52, the contact portion 51-1 in dotted lines shown at the bottom of FIG. 2 of the elastic rod 51 occupies the free position PL, and bars the hook 52 from going through before the mounting. To allow the mounting, the actuation face FA of the hook 52 is arranged to deform the elastic rod 51 during a vertical relative movement between the two parts, so that the contact portion 51-1 of the elastic rod 51 moves as shown by the arrows in FIG. 2, to the released position PD, to then be automatically returned to the retaining position PR due to the elastic return force exerted by the rest of the elastic rod (in particular the deformation portion 51-2 deformed and tensioned during the movement of the contact portion 51-1. However, it should be noted that the contact portion 51-1 and even the anchoring portion 51-3 can also deform and participate in the return to the retaining position PR).

In this implementation, to perform the mounting, the safety module 40 is moved in a mounting direction that is parallel to the hub axis AM, but other mounting directions may be envisaged.

FIG. 3 shows a sectional top view of the retaining device of FIG. 1, with, in the left-hand portion, the elastic rod 51 in a retaining position PR. Indeed, the left part represents the vehicle steering wheel with the mounted safety module, that is to say with the elastic rod 51 engaged under the hook 52, to retain it. It may be noted that the elastic rod is kept rigidly connected to the hub 20 by three attachment portions 22 of the hub 20, engaged with the anchoring portion 51-3 of the elastic rod 51.

The right-hand part of FIG. 3 shows the vehicle steering wheel with the safety module 40 being mounted. In this FIG. 3, the mounting direction (parallel to the hub axis AM, that is, the line z) is normal to the plane of FIG. 3. FIG. 3 shows the mounting in particular when the contact portion 51-1 is in the released position PD. In this released position PD, no part of the contact portion 51-1 shown in solid lines hinders the actuation face FA, so that the hook 52 can freely pass through the passage hole 21 (note that a gap is shown between the contact portion 51-1 in solid lines and the hook 52 for clarity's sake, although in reality, there is no gap).

In addition, in thin mixed lines, the contact portion 51-1 is shown at any instant of the mounting, in a mounting position PM.

At this moment, the contact portion 51-1 is in contact with the actuation face FA at a point of contact PC.

According to the invention, this point of contact PC is located on a guide track arranged on a first side 52-1 of the hook 52, and preferably on the side of the hook 52 furthest from the deformation portion 51-2 of the elastic rod 51. In other words, the point of contact PC is located as close as possible to the free end of the elastic rod 51. Consequently, the leverage generated between the point of contact PC and the deformation portion 51-2 (to deform the elastic rod 51) is as large as possible, which guarantees a minimum mounting force.

Furthermore, in order to guarantee that no parasitic contact between the elastic rod 51 and the rest of the actuation face FA occurs during mounting, the actuation face FA comprises an offset between the first side 52-1 of the hook 52 and a second side 52-2 of the hook 52. In the cutting plane of FIG. 3, normal to the mounting direction (hub axis AM, or z axis of FIG. 3), it may be noted that the hook 52 has in the direction x a first length of the first side greater than a second length of the second side 52-2.

Consequently, a gap j may be noted between the contact portion 51-1 and any point on the actuation face other than the point of contact PC of the guide track (here, the gap j is indicated positive at the second side level 52-2, but there is positive gap between the contact portion 51-1 and the actuation face FA at any point between the point of contact PC and the second side 52-2).

In other words, the offset provided on the actuation face FA causes an asymmetrical section of the hook 52 (here the ribs of the hook 52 form an H with flanges of different lengths as clearly shown by the uneven cross-hatched parts, but it is possible to provide other shapes, such as for example an actuation face FA without ribs, simply with a slope, a recess or a relief to form the offset and guarantee the gap j).

In other words, due to the offset, the actuation face FA has two inclinations: a first slope relative to the mounting direction in order to progressively deform the elastic rod 51 during the mounting of the safety module, and a second slope relative to the direction y of FIG. 3, to guarantee the gap j at every point off of the guide track.

In the embodiment shown, the point of contact PC remains on the first side 52-1 of the hook the entire time, all along the mounting, so that in the plane yz of FIG. 3, a projection of the path from the point of contact PC is a straight line parallel to the axis z.

It is also possible to provide for forming the rib of the first side 52-1 with a dome or an edge or at least a reduced surface area to have a linear or even spot contact between the contact portion 51-1 and the hook 52, at the actuation face FA, so as to control the position of the point of contact, and at the very least limit as much as possible any movement of the point of contact during mounting upwards along the y-axis, which would result in the leverage acting on the bending or deformation of the elastic rod 51 and would increase the mounting forces.

In conclusion, thanks to the offset provided on the actuation surface FA of the hook 52, the guide track (on which the point of contact PC moves during the mounting of the safety module) ensures:
the lowest possible mounting force due to the leverage being as large as possible
a variation in the mounting force without a sudden or abrupt increase, due to the absence of parasitic contact which would cause the leverage to vary and/or decrease sharply.

As shown in FIG. 4, the offset provided on the actuation face FA guarantees that the path of the point of contact PC:
follows the curve T1, located on the first side 52-1 of the hook 52, and
does not deviate during mounting to approach the second side 52-2 in order to follow the curve T2, and
does not leave the second side 52-2 of the hook 52 at a given moment of the mounting to follow the curve T3.

The curves T2 and T3 return to significantly decrease the leverage which acts to tighten the spring, a contact between the contact portion 51-1 and the hook 52 on these curves would be able to significantly increase the force necessary to deform the elastic rod 51, which would make mounting more difficult. With the offset that guarantees that the contact path follows the curve T1, the forces remain as low as possible, and do not vary suddenly.

It will be understood that various modifications and/or improvements which are obvious to a person skilled in the art may be made to the different embodiments of the invention described in the present description without departing from the scope of the invention.

The invention claimed is:

1. A retaining device of a safety module mounted on a vehicle steering wheel structure, comprising:
at least one latching element rigidly connected to one of the safety module or the steering wheel structure,
at least one elastic element rigidly connected to the other of the safety module or the steering wheel structure, and arranged so as to engage with the latching element in order to retain the safety module on the steering wheel structure,
the elastic element comprising a contact portion arranged such that, when there is a movement of mounting the safety module on the steering wheel structure, the contact portion comes into contact with a guide track arranged on an actuation face of the latching element located facing the elastic element,
the guide track being arranged to deform the elastic element to a released position of the latching element, during the movement of mounting carried out in a mounting direction,
wherein the guide track is arranged on a first side of the latching element, and in that the actuation face has at least one offset arranged between the guide track and a second side of the latching element,
wherein the latching element comprises two ribs, and
wherein the guide track is formed on only one of the two ribs.

2. The retaining device according to claim 1, wherein the offset is defined to leave a strictly positive gap between the elastic element and the second side of the latching element during the movement of mounting.

3. The retaining device according to claim 1, wherein, in a cutting plane normal to the mounting direction and in a direction defined by a force exerted by the elastic element on the latching element, the first side has a first length, greater than a second length of the second side.

4. The retaining device according to claim 1, wherein, in at least one cutting plane normal to the mounting direction the latching element has an H-shaped section, with a first flange of the H arranged on the first side and a second flange of the H arranged on the second side, the first flange having a first length greater than a second length of the second flange.

5. The retaining device according to claim 1, wherein the elastic element comprises a deformable portion connected to the contact portion, and wherein the second side is arranged between the deformable portion and the first side.

6. The retaining device according to claim 5, wherein, during the movement of mounting, a distance between the deformable portion and a point of contact between a contact path and the contact portion is less than 40 mm.

7. The retaining device according to claim 1, wherein the elastic element is arranged to be deformed in bending during the movement of mounting, and wherein a bending direction is normal to the mounting direction.

8. The retaining device according to claim 1, wherein the latching element is formed of plastic and/or polymer material.

9. The retaining device according to claim 1, wherein the latching element is formed by an injection molding process.

10. The retaining device according to claim 1, wherein the latching element is rigidly connected to the safety module.

11. The retaining device according to claim 1, wherein the guide track is arranged to provide a linear contact with the contact portion.

12. The retaining device according to claim 1, comprising two latching elements and one or two elastic elements.

13. The retaining device according to claim 1 in combination with a vehicle steering wheel.

14. The retaining device according to claim 1 in combination with a motor vehicle.

15. The retaining device according to claim 1, further comprising a space between the two ribs.

16. The retaining device according to claim 1, wherein the elastic element is configured to only contact the only one of the two ribs during mounting.

17. The retaining device according to claim 1, wherein the guide track is formed on an exterior surface of the only one of the two ribs.

* * * * *